(12) United States Patent
Watanabe (10) Patent No.: US 7,742,786 B2
(45) Date of Patent: Jun. 22, 2010

(54) WIRELESS NETWORK SYSTEM, WIRELESS COMMUNICATION DEVICE AND CONNECTION SET-UP METHOD

(75) Inventor: Mitsuhiro Watanabe, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 11/201,051

(22) Filed: Aug. 9, 2005

(65) Prior Publication Data
US 2006/0034234 A1 Feb. 16, 2006

(30) Foreign Application Priority Data
Aug. 10, 2004 (JP) .............................. 2004-233430

(51) Int. Cl.
*H04B 1/38* (2006.01)
(52) U.S. Cl. ...................... 455/557; 455/41.2; 455/558; 455/552; 455/550
(58) Field of Classification Search ........................ None
See application file for complete search history.

(56) References Cited

U.S. PATENT DOCUMENTS

| 5,930,368 | A | 7/1999 | Hocker et al. |
| 6,067,076 | A | 5/2000 | Hocker et al. |
| 2002/0147819 | A1 | 10/2002 | Miyakoshi et al. |
| 2003/0091015 | A1 | 5/2003 | Gassho et al. |
| 2003/0100335 | A1* | 5/2003 | Gassho et al. ............... 455/552 |
| 2006/0172769 | A1* | 8/2006 | Oh .............................. 455/557 |

FOREIGN PATENT DOCUMENTS

| JP | 11-150547 A | 6/1999 |
| JP | 2001-320373 A | 11/2001 |
| JP | 2002-359623 A | 12/2002 |
| JP | 2003-143156 A | 5/2003 |
| JP | 2003-218875 A | 7/2003 |

* cited by examiner

*Primary Examiner*—Charles N Appiah
*Assistant Examiner*—Randy Peaches
(74) *Attorney, Agent, or Firm*—Cowan, Liebowitz & Latman, P.C.

(57) ABSTRACT

Parameters relating to wireless communication in a wireless network system are set in a printer, which is to be wirelessly connected to the network system anew, from a personal computer that is already wirelessly connected, and the personal computer acquires identification information of the printer and transmits this identification information to an access point. The access point sets up the connection to the printer based upon the identification information that has been transmitted from the personal computer. This makes it possible to connect a new wireless communication apparatus to a wireless network system through a simple set-up operation.

10 Claims, 9 Drawing Sheets

WIRELESS NETWORK SYSTEM, WIRELESS COMMUNICATION DEVICE AND CONNECTION SET-UP METHOD

CLAIM OF PRIORITY

This application claims priority from Japanese Patent Application No. 2004-233430 filed Aug. 10, 2004, which is hereby incorporated by reference herein.

FIELD OF THE INVENTION

This invention relates to a technique for setting up a connection to an access point in a wireless network system in which a plurality of wireless communication devices construct a network.

BACKGROUND OF THE INVENTION

Peripherals such as digital cameras, printers, storage devices, scanners, data input devices and data output devices handled as the peripheral devices of computers are now capable of communicating directly, without the intervention of a computer, using cables. Meanwhile, there is growing demand for the wireless transmission of information that has been performed via cable until now, and wireless communication is starting to be used in communication among the above-mentioned peripheral devices (e.g., see Prior Art 1: Japanese Patent Application Laid-Open No. 2003-218875).

In order to assure security in a wireless network, it is so arranged that wireless terminals that are capable of accessing the wireless network are limited by means such as MAC address filtering at the access point.

The following two-stage set-up operation is required in order to make it possible to connect a new wireless communication device to a wireless network system, and the set-up operation is a troublesome one:

(1) the parameters of the wireless network system are set in the new wireless communication device; and
(2) information concerning the new wireless communication device is registered at the access point as an accessible terminal.

When these setting are terminated, a new wireless communication device can join in a wireless network, and communication via the wireless network can be performed.

SUMMARY OF THE INVENTION

Accordingly, an object of the present invention is to make it possible to connect a new wireless communication device to a wireless network system.

In accordance with one aspect of the present invention, the foregoing object is attained by providing a wireless network system in which a wireless network is constructed by a wireless communication apparatus and an access point, comprising:

a device configured to set parameters, which relate to wireless communication in the wireless network system, from an already wirelessly connected first wireless communication apparatus to a second wireless communication apparatus to be wirelessly connected anew;
a device whereby the first wireless communication apparatus acquires identification information of the second wireless communication apparatus;
a device whereby the first wireless communication apparatus transmits the identification information to the access point; and
a device whereby the access point manages a connection to the second wireless communication apparatus based upon the identification information that has been transmitted from the first wireless communication apparatus.

Further, in accordance with one aspect of the present invention, there is provided a wireless communication apparatus comprising:

a setting device configured to set parameters, which relate to wireless communication in a wireless network system to another wireless communication apparatus;
an acquisition device configured to acquire identification information of the another wireless communication apparatus; and
a transmission device configured to transmit the identification information to a access point, and cause the access point to perform connection management of the another wireless communication apparatus.

Further, in accordance with one aspect of the present invention, there is provided a method of setting up a connection in a wireless network system in which a wireless network is constructed by a wireless communication apparatus and an access point, the method comprising:

setting parameters, which relate to wireless communication in the wireless network system, from an already wirelessly connected first wireless communication apparatus to a second wireless communication apparatus to be wirelessly connected anew;
acquiring identification information of the second wireless communication apparatus by the first wireless communication apparatus;
transmitting the identification information to the access point by the first wireless communication apparatus; and
managing a connection to the second wireless communication apparatus by the first wireless communication apparatus based upon the identification information that has been transmitted from the first wireless communication apparatus.

Further, in accordance with one aspect of the present invention, there is provided a method of setting up a connection of a wireless communication apparatus, the method comprising:

setting parameters, which relate to wireless communication in the wireless network system, to another wireless communication apparatus;
acquiring identification information of the another wireless communication apparatus; and
transmitting the identification information to a access point and causing the access point to perform connection management of the another wireless communication apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

Preferred embodiments for practicing the present invention will now be described in detail with reference to the drawings. Although a wireless LAN compliant with IEEE 802.11x is taken as an example of a wireless network in this embodiment, the present invention is not limited to this example and is applicable also to other wireless networks.

First Embodiment

A set-up method in a case where a wireless terminal is connected to a network such as a wireless LAN compliant with IEEE 802.11x of IEEE 802.11b/a/g, etc. will be described below with reference to the drawings.

Figure 1:
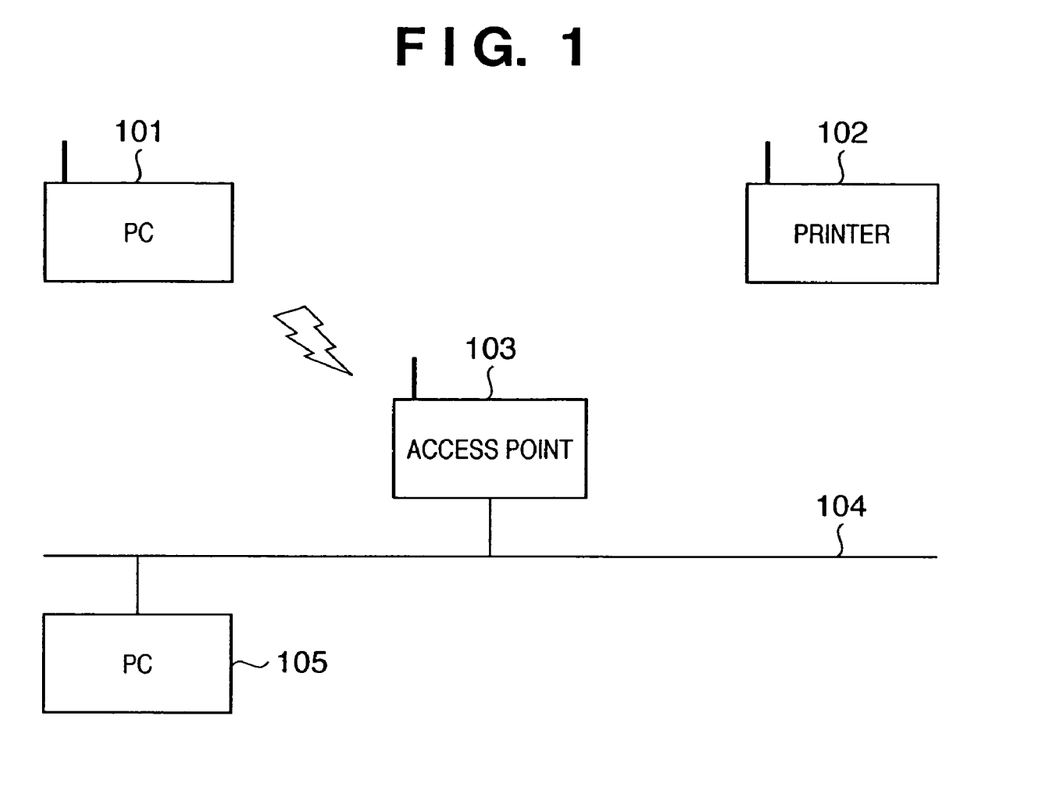
FIG. 1 is a diagram illustrating an example of the configuration of a wireless network system.

FIG. 1 is a diagram illustrating an example of the configuration of a wireless network system. As shown in FIG. 1, a personal computer (PC) 101 is connected to an access point 103 using a wireless LAN, and a personal computer 105 is connected to the access point 103 using a wired LAN line 104.

The access point 103 acts as a relay between the wireless LAN and the wired LAN line 104 and is capable of communicating data between the personal computer 101 and the personal computer 105.

Figure 3:
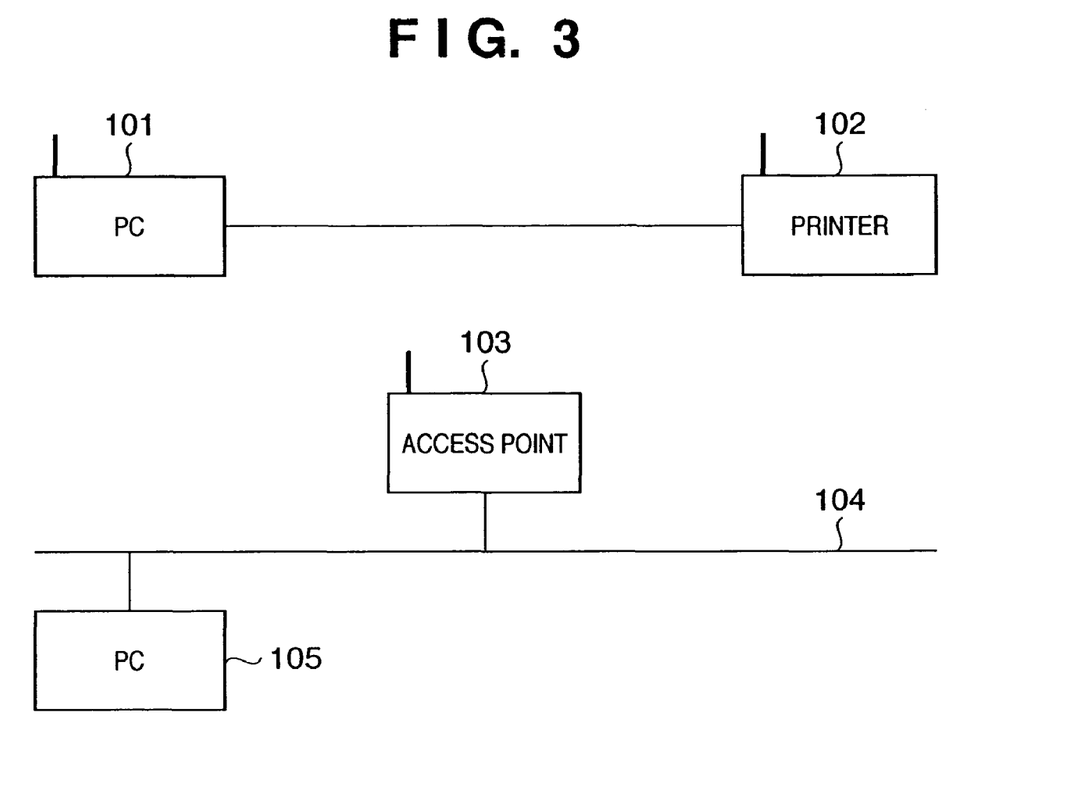
FIG. 3 is a diagram illustrating an arrangement in which the printer is set up from a personal computer.

A method of setting up terminals in a case where the wireless-LAN-compatible printer 102 is connected to a network in an infrastructure-mode wireless network system of the above kind will now be described. FIG. 3 is a diagram illustrating an arrangement in which the printer 102 is set up from the personal computer 101. As shown in FIG. 3, the wireless-LAN-compatible printer 102 and personal computer 101 are connected to each other using a wired line and the printer 102 is set using the personal computer 101.

Figure 4:
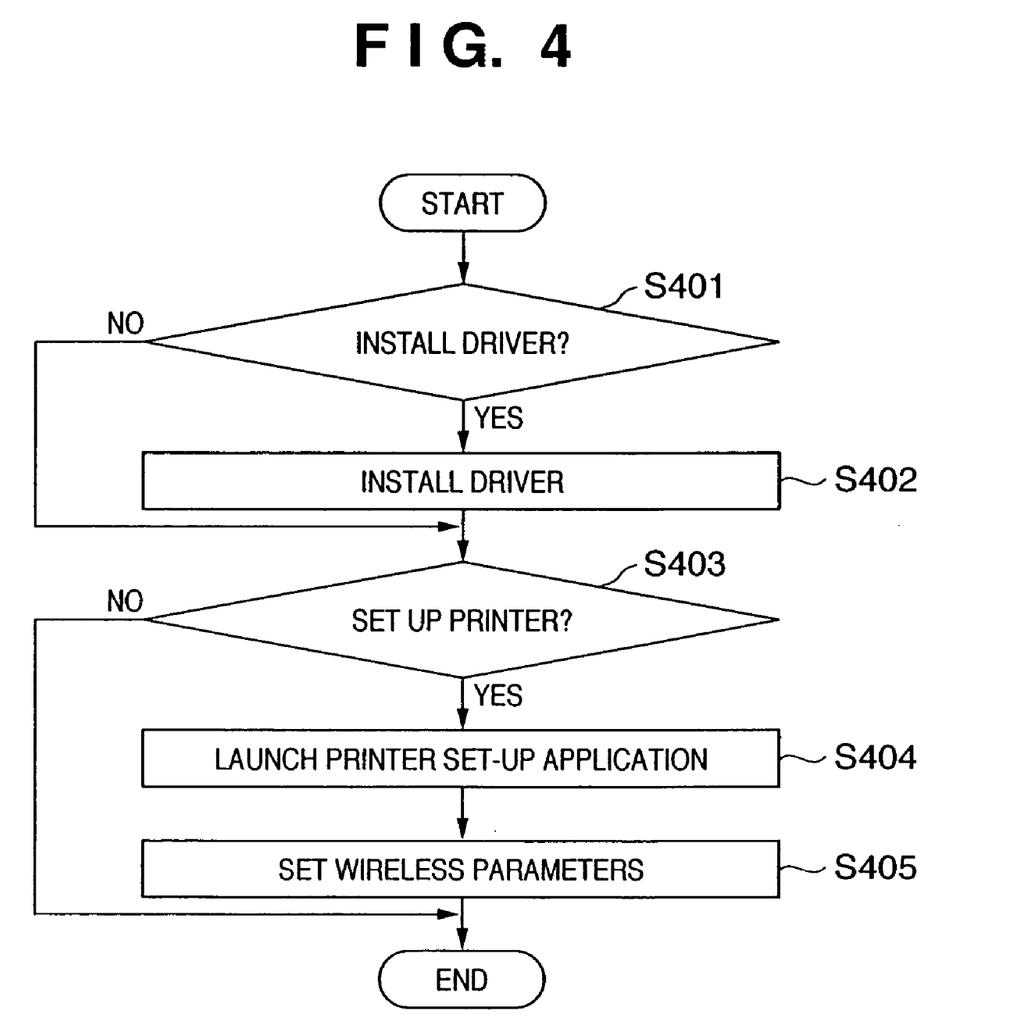
FIG. 4 is a flowchart illustrating the installation of a driver in the personal computer and the setting of the printer by the personal computer.

FIG. 4 is a flowchart illustrating the installation of a driver in the personal computer 101 and the setting of the printer by the personal computer 101. First, if it is decided at step S401 that the driver of the wireless-LAN-compatible printer 102 is to be installed in the personal computer 101, control proceeds to step S402, at which the printer driver for the printer 102 is installed. If installation has been completed, or if the driver is not to be installed, control proceeds to step S403. Here it is determined whether a wireless LAN set-up is to be made for the printer 102. If the wireless LAN set-up is to be performed, control proceeds to step S404, where an application for setting up the wireless LAN for printer 102 is launched, and then to step S405, at which the parameters of the wireless LAN are set.

Figure 5:
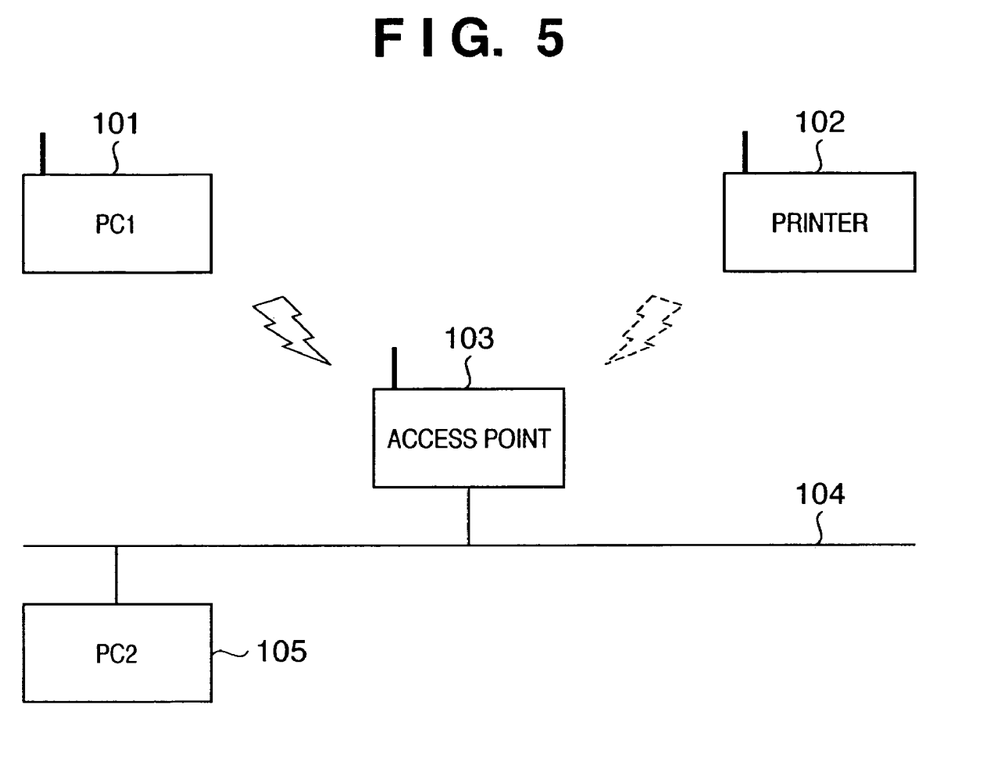
FIG. 5 is a diagram illustrating a state in which access from the printer is refused by an access point.

By virtue of the processing shown in FIG. 4, preparations for connecting the wireless-LAN-compatible printer 102 to the access point 103 are completed. On the side of the 103, however, if an accessible terminal is being set, access from the printer 102 will be refused, as shown in FIG. 5, for the sake of security. As a consequence, printing from the personal computer 101 to the printer 102 still cannot be carried out. Accordingly, it is necessary to make a setting at the access point 103 that will allow access from the printer 102.

Figure 6:
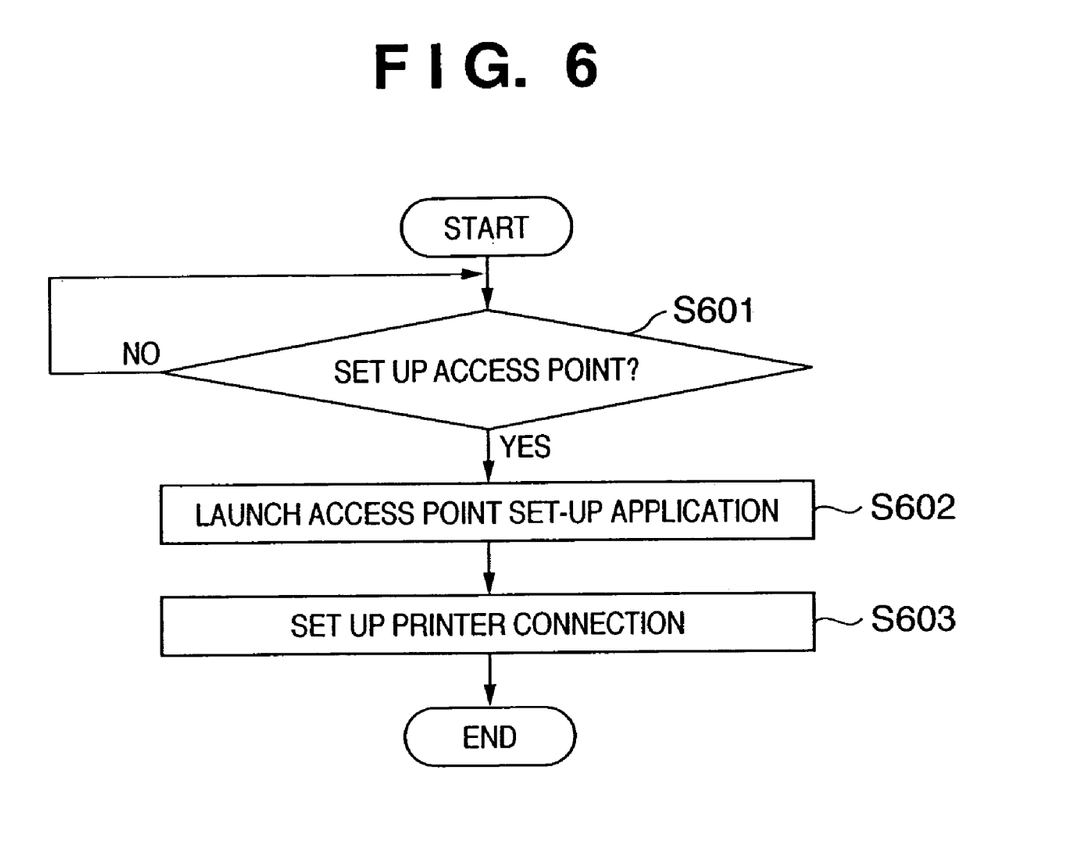
FIG. 6 is a flowchart illustrating processing for setting up the access point by a personal computer.

FIG. 6 is a flowchart illustrating processing for setting up the access point 103 by the personal computer 105. First, if an operation for setting up the access point 103 is performed at step S601, control proceeds to step S602, at which an application for setting up the access point is launched. Then, at step S603, a setting for enabling connection of the wireless-LAN-compatible printer 102 to the access point 103 is made in the application. This setting is processing whereby the MAC address of the printer 102 is registered as a MAC address that is capable of being connected to the access point 103.

Figure 7:
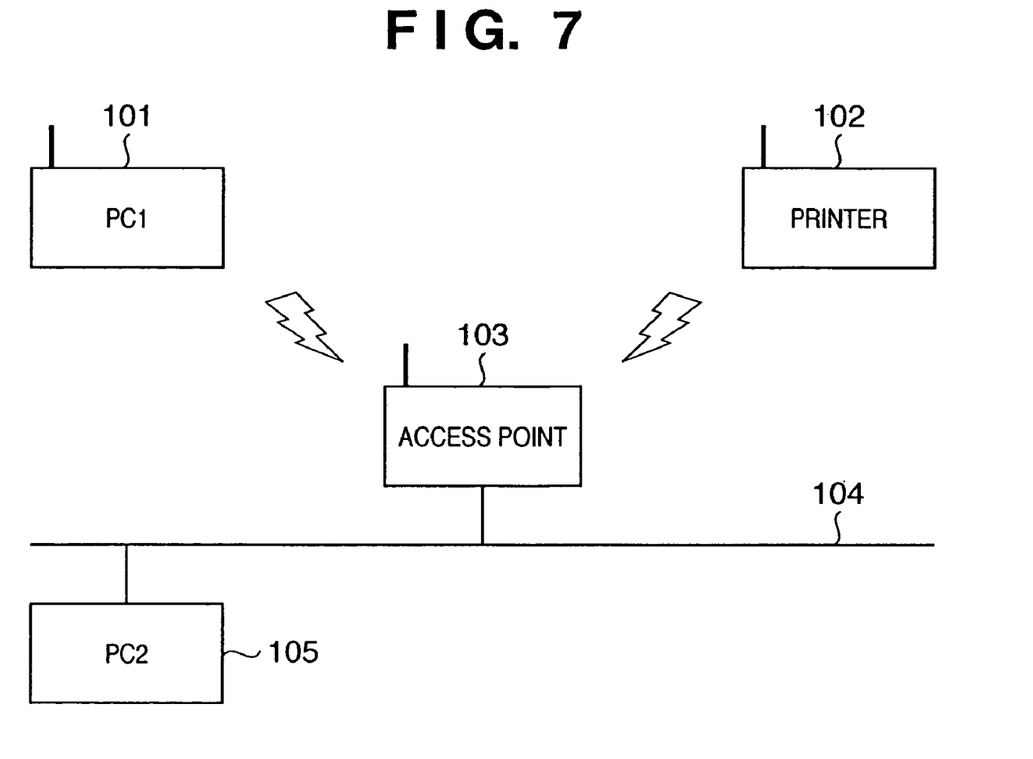
FIG. 7 is a diagram illustrating a state in which the wireless-LAN-compatible printer has been connected to the wireless network system.

Thus, as described above, in order to use the printer 102, first the wireless-environment parameters are set in the wireless-LAN-compatible printer 102 from the personal computer 101, then a setting for allowing connection of the printer 102 to the access point 103 is performed at the personal computer 105. When these setting are terminated, it finally becomes possible for the printer 102 to participate in the wireless network system. FIG. 7 is a diagram illustrating a state in which the wireless-LAN-compatible printer 102 has been connected to the wireless network system.

A method for simplifying a setting operation to connect a new wireless communication device to a wireless network will be described.

A set-up method for making it possible to connect a wireless-LAN-compatible printer to an access point of a wireless LAN through a simple operation at a computer such as a personal computer in an infrastructure-mode wireless network system will be described as a first embodiment.

Figure 8:
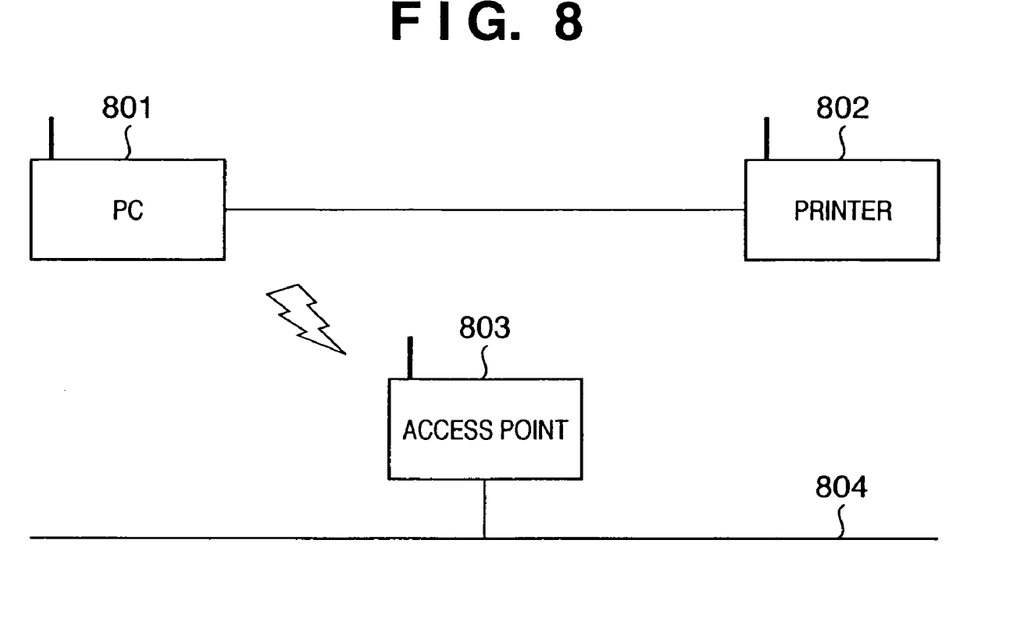
FIG. 8 is a diagram illustrating an example of the configuration of a wireless network system according to an embodiment of the present invention.

FIG. 8 is a diagram illustrating an example of the configuration of a wireless network system according to a first embodiment of the present invention. As shown in FIG. 8, a personal computer (PC) 801 and a wireless-LAN-compatible printer 802 to be added to the system anew are connected by a cable (e.g., a USB, LAN, etc.) and the parameters of the wireless LAN are set from the personal computer 801.

Figure 2:
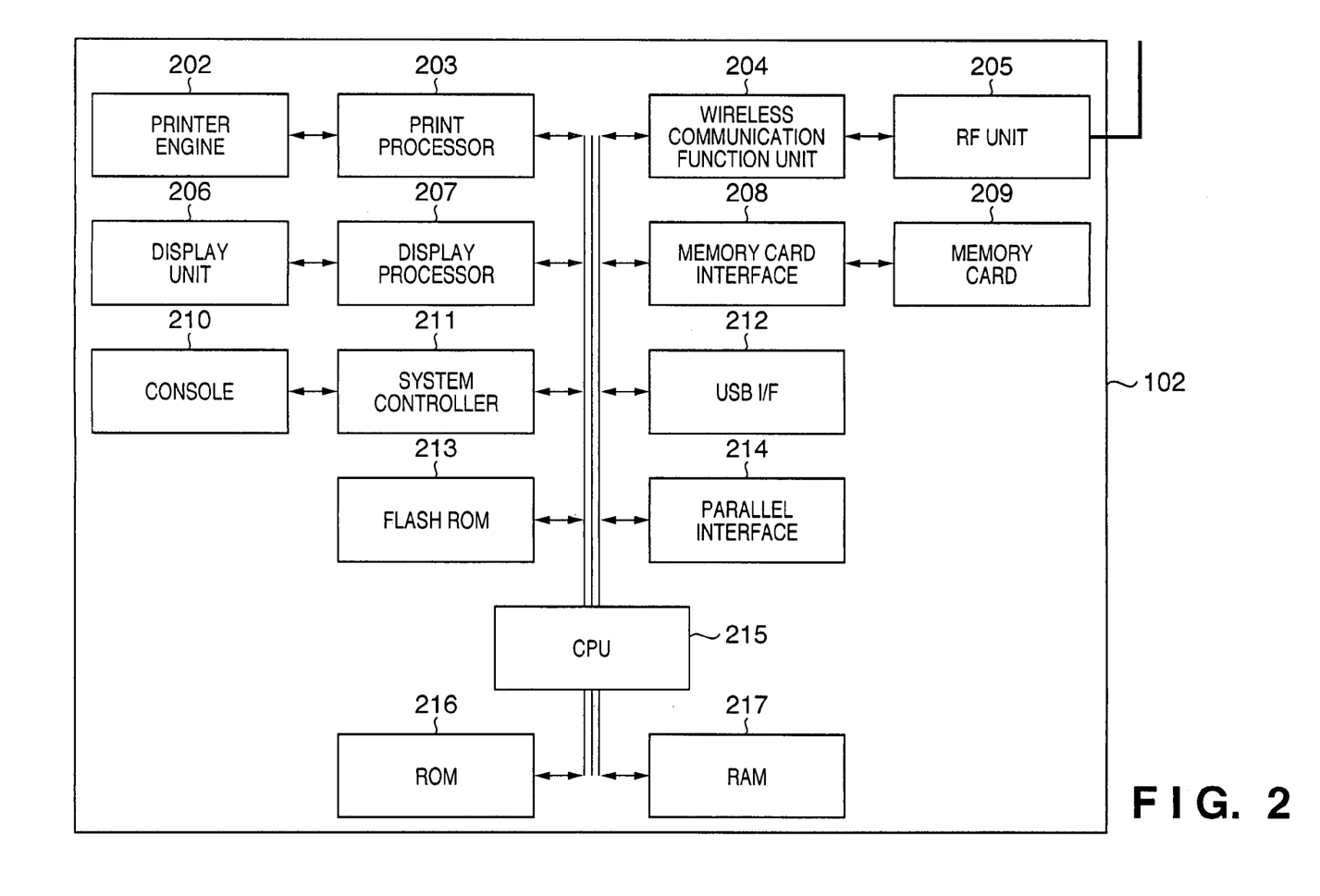
FIG. 2 is a functional block diagram illustrating the structure of a wireless-LAN-compatible printer.

FIG. 2 is a functional block diagram illustrating the structure of the wireless-LAN-compatible printer 802. A console 210 in FIG. 2 includes a plurality of keys and is connected to a CPU 215 via a system controller 211. A printer engine 202 actually prints an image on paper and receives an input of image data that has been processed by a print processor 203. A display unit 206, such as an LCD display, LED display or voice display, displays information to a user. Display information that has been processed by a display processor 207 is input to the display unit 206.

A wireless communication function unit 204 controls wireless communication, and an RF unit 205 sends and receives a radio signal to and from other wireless communication devices. A memory card interface 208 is an interface for connecting a memory card 209, a USB (Universal Serial Bus) interface 212 is an interface for connecting an external device using a USB, and a parallel interface 214 is an interface for connecting an external device using parallel communication.

These functional units are controlled by commands from the CPU 215, a program that is executed by the CPU 215 is stored in a ROM 216 or flash ROM 213, and data processed by the CPU 215 is written to or read in from the RAM 217 or flash ROM 213.

In a case where the wireless-LAN-compatible printer 802 is set up as a printer in a wireless network system in the configuration described above, the personal computer 801 and printer 802 are connected to each other by a cable, as shown for example in FIG. 8, and the parameters (network identifier, secret code, authentication, etc.) of the wireless network system are set from the personal computer 801.

Figure 9:
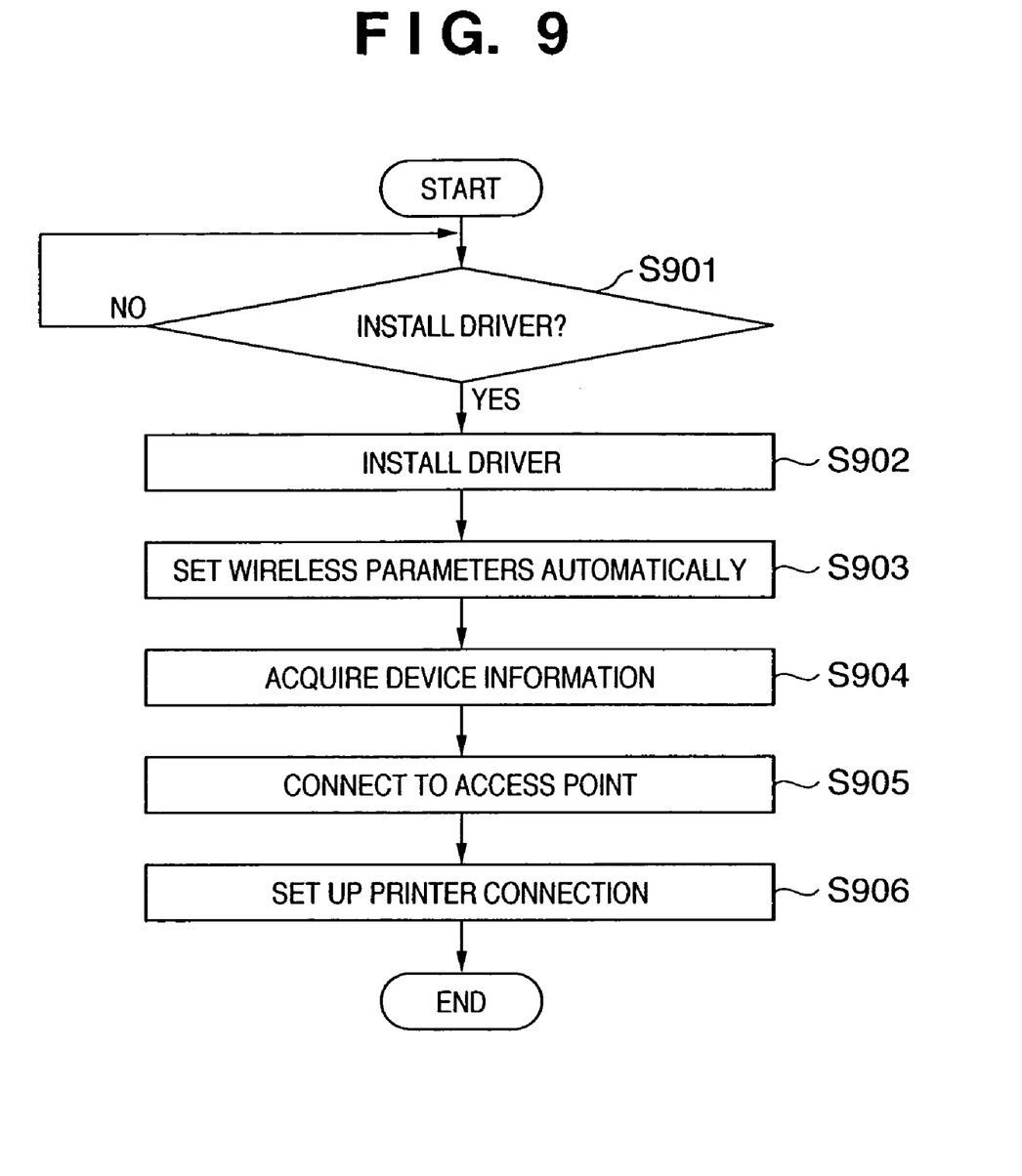
FIG. 9 is a flowchart illustrating set-up processing by a personal computer according to the embodiment.

FIG. 9 is a flowchart illustrating set-up processing executed by the personal computer 801 according to the first embodiment. First, if it is found at step S901 that a user has instructed the personal computer 801 to install the printer driver for the printer 802, then control proceeds to step S902, at which the personal computer 801 starts the installation of the driver. When installation ends, control proceeds to step S903, at which the wireless-LAN parameters of the printer 802 are set automatically using wireless-LAN parameters that have been stored in the personal computer 801.

Next, the personal computer 801 acquires printer-specific information (e.g., a MAC address) from the printer 802 at step S904 and makes a connection to an access point 803 by the wireless LAN at step S905. Finally, at step S906, the personal computer 801 transmits the printer-specific information to the access point 803, and sets specific information of the printer 802 to the access point 803. That is, the personal computer 801 sets printer-specific information to the access point 803 as device information being connectable to the access point 803.

Thus, in accordance with the first embodiment, the user, merely by installing a printer driver from a personal computer, sets up the necessary wireless-LAN environment at both the printer and access point and makes it possible for the printer to be used immediately within the wireless network system.

Second Embodiment

A second embodiment of the present invention will now be described. In the first embodiment, a printer has been described as an example of the wireless communication device. However, a digital camera, storage device, scanner, data input device or data output device, etc., can be made connectable to a wireless LAN system in simple fashion as a wireless communication device using a similar method.

Further, the connection between the personal computer 801 and printer 802 is a wired connection in the first embodiment. However, it is also possible to implement the connection using a short-distance communication scheme that employs an IrDA (Infrared Data Association) scheme or weak radio waves.

In addition, a wireless LAN has been mentioned as an example of a wireless communication scheme. However, the present invention is applicable even with a USB or other wireless communication scheme. Further, although a MAC address has been mentioned as an example of information specific to a wireless communication device, it is also possible to apply information that distinguishes the device, such as IPv6.

Further, as other examples of methods of restricting access of the personal computer 801 to the access point 803, a technique that sets limitation on access by employing a standardized database referred to as an MIB (Management Information Base) using a network management protocol referred to as SNMP (Simple Network Management Protocol) or a manufacturer-specific company MIB may be used.

Further, it is permissible to apply a technique whereby the set-up is made using a command that is specific to the access point, or a technique whereby the set-up is performed upon accessing an HTML server that provides the access point.

Thus, as described above, the embodiments are such that in a wireless network system in which a plurality of wireless communication devices perform wireless communication via an access point, parameters relating to wireless communication in the wireless network system are transmitted from a first wireless communication device, which is already performing wireless communication in the wireless network system, to a second wireless communication device, which is about to perform wireless communication in the wireless network system from now onward. Information that identifies the second wireless communication device is transmitted to the first wireless communication device, the information that identifies the second wireless communication device is transmitted from the first wireless communication device to the access point, and the access point allows access from the second wireless communication device based upon the information that has been transmitted from the first wireless communication device. As a result, it becomes possible for the second wireless communication device to perform communication in the system, the setting of the parameters for wireless communication can be performed with ease and a new wireless communication device can be incorporated in the system easily.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

In accordance with the present invention, it is possible for a new wireless communication device to be connected to a wireless network system through a simple set-up operation.

As many apparently widely different embodiments of the present invention can be made without departing from the spirit and scope thereof, it is to be understood that the invention is not limited to the specific embodiments thereof except as defined in the appended claims.

What is claimed is:

1. A wireless network system in which wireless connection to a wireless network, which has been formed by an access point, from a wireless communication apparatus is permitted by the access point in a case where parameters including a network identifier of the wireless network are set to the wireless communication apparatus and identification information of the wireless communication apparatus is registered in the access point, wherein a first wireless communication apparatus comprises:
   a unit that transmits the parameters to a second wireless communication apparatus using a communication method different from the wireless connection and sets the parameters within the second wireless connection and sets the parameters within the second wireless communication apparatus, wherein as to the wireless connection to the wireless network, the first wireless communication apparatus has already been permitted and the second wireless communication apparatus is not yet permitted;
   a unit that acquires identification information of the second wireless communication apparatus using the communication method when the parameters are set; and
   a unit that transmits the acquired identification information to the access point by the wireless communication, according to the acquisition of the identification information, and
   wherein the access point comprises a unit that manages the second wireless communication apparatus as an apparatus in which the wireless connection to the wireless network is permitted, by registering the identification information transmitted from the first wireless communication apparatus.

2. A wireless communication apparatus in a wireless network system in which wireless connection to a wireless network, which has been formed by an access point, from a wireless communication apparatus is permitted by the access point in a case where parameters including a network identifier of the wireless network are set within the wireless communication apparatus and identification information of the wireless communication apparatus is registered in the access point comprising:
   a setting unit that transmits the parameters to another wireless communication apparatus using a communication method different from the wireless communication, and sets the parameters within the second wireless communication apparatus, wherein as to the wireless connection to the wireless network, the wireless communication apparatus has already been permitted and said another wireless communication apparatus is not yet permitted;
   an acquisition unit that acquires identification information of said another wireless communication apparatus using the communication method when the parameters are set by the setting unit; and
   a transmission unit that transmits the acquired identification information to the access point by the wireless communication, according to the acquisition by the acquisition unit, wherein said another wireless communication apparatus is managed by the access point as an apparatus in which the wireless connection to the wireless network is permitted by registering the identification information.

3. The apparatus according to claim 2, wherein a MAC address of said another wireless communication apparatus is used as the identification information of said another wireless communication apparatus.

4. The apparatus according to claim 2, wherein said transmission device transmits the identification information by using an SNMP (Simple Network Management Protocol).

5. The apparatus according to claim 2, wherein said transmission device transmits the identification information by accessing an HTML server provided by the access point.

6. The apparatus according to claim 2, wherein said setting device sets the parameters when a driver for using said another wireless communication apparatus is installed.

7. A method of setting up a connection in a wireless network system in which wireless connection to a wireless network, which has been formed by an access point, from a wireless communication apparatus is permitted by the access point in a case where parameters including a network identifier of the wireless network are set within the wireless communication apparatus and identification information of the wireless communication apparatus is registered in the access point, the method comprising:
   setting, by a first wireless communication apparatus, the parameters within a second wireless communication apparatus employing a communication method different from the wireless connection, wherein as to the wireless connection to the wireless network, the first wireless communication apparatus has already been permitted and the second wireless communication apparatus is not yet permitted;
   acquiring, by the first wireless communication apparatus, identification information of the second wireless communication apparatus using the communication method when the parameters are set;
   transmitting, by the first wireless communication apparatus, the acquired identification information to the access point by the wireless communication, according to the acquisition of the identification information; and
   managing, by the access point, the second wireless communication apparatus as an apparatus in which the wireless connection to the wireless network is permitted, by registering the identification information transmitted from the first wireless communication apparatus.

8. A method of setting up a connection of a wireless communication apparatus in a wireless network system in which wireless connection to a wireless network, which has been formed by an access point, from a wireless communication apparatus is permitted by the access point in a case where parameters including a network identifier of the wireless network are set within the wireless communication apparatus and identification information of the wireless communication apparatus is registered in the access point the method comprising:
   setting the parameters to another wireless communication apparatus using a communication method different from the wireless communication, wherein as to the wireless connection to the wireless network, the wireless communication apparatus has already been permitted and said another wireless communication apparatus is not yet permitted;
   acquiring identification information of said another wireless communication apparatus using the communication method when the parameters are set in the setting step; and
   transmitting the acquired identification information to the access point by the wireless communication, according to the acquisition of the identification information, wherein said another wireless communication apparatus is managed by the access point as an apparatus in which the wireless connection to the wireless network is permitted by registering the identification information.

9. A program stored on a computer-readable medium for causing a computer to implement the method of setting up a connection of a wireless communication apparatus set forth in claim 8.

10. A computer-readable recording medium on which the program set forth in claim 9 has been recorded.

\* \* \* \* \*